June 27, 1967

F. SCOGNAMILLO 3,327,638

ROTARY MACHINE WITH END PLATES SEALING
BLADES SLIDING IN SLOTS IN A ROTOR

Filed Dec. 13, 1966

INVENTOR.
FRANK SCOGNAMILLO

BY

United States Patent Office 3,327,638
Patented June 27, 1967

3,327,638
ROTARY MACHINE WITH END PLATES SEALING
BLADES SLIDING IN SLOTS IN A ROTOR
Frank Scognamillo, 118 Walnut St.,
Ridgewood, N.J. 07070
Filed Dec. 13, 1966, Ser. No. 601,463
2 Claims. (Cl. 103—136)

ABSTRACT OF THE DISCLOSURE

Blades sliding in slots in a rotor are sealed in place by freely rotating plates at the ends of the rotor.

Briefly summarized, the invention comprises the provision of thin, flat plates rotatably supported at opposite ends of a rotor, imperforate so as to completely seal the ends of the blades and the slots in which they are mounted and having projections on their inner faces engaging the ends of the blades so as to turn with the rotor.

Figure 1:
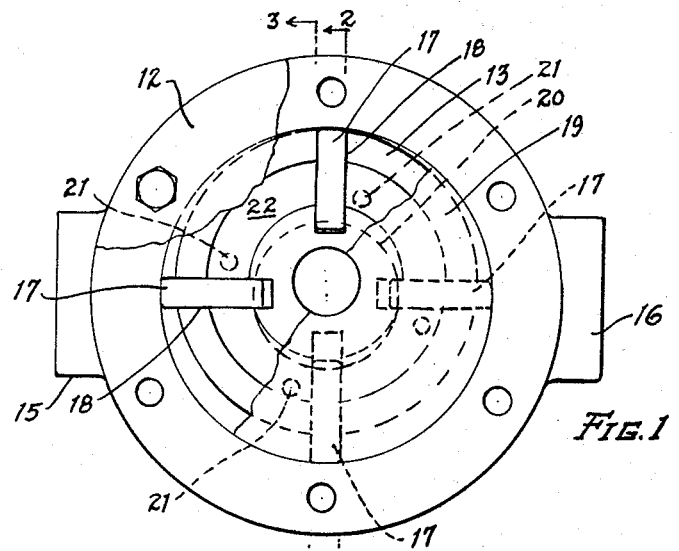
FIG. 1 is an end view of one of the machines with front cover partly removed to expose internal parts.
Figure 2:
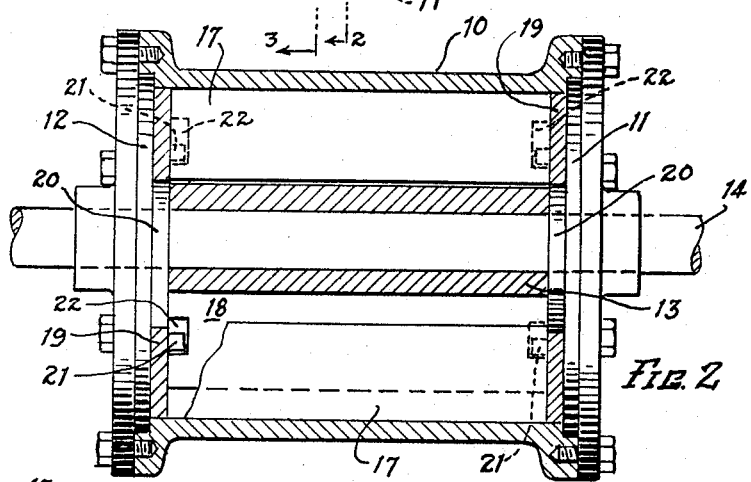
FIG. 2 is a longitudinal sectional view on substantially the plane of line 2—2 of FIG. 1.
Figure 3:
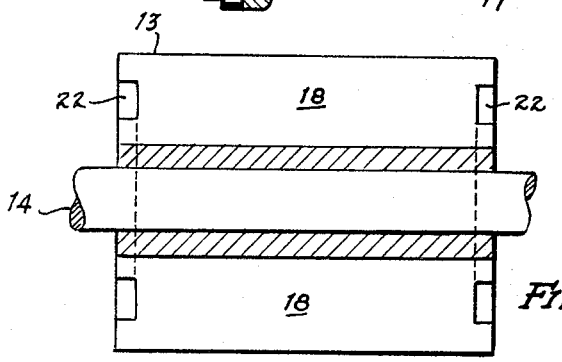
FIG. 3 is a longitudinal sectional view of the rotor on line 3—3 of FIG. 1.

The body of the machine is shown in the form of a housing having an annular cylindrical wall 10, closed at opposite ends by flat single plane end walls 11 and 12; the latter in the form of a cover removable for access to internal parts.

The roller 13 is cylindrical in form, carried by shaft 14, tangent to the surrounding cylindrical wall.

The cylindrical wall is shown as having inlet and outlet passages 15, 16 at opposite sides of the line of tangency.

The rotor carries blades 17 sliding in radial slots 18; these blades having ends flush with the ends of the rotor.

The blades are sealed in the slots by end plates 19 of thin, flat, preferably low friction material covering the ends of the rotor, concentric with the cylindrical wall of the casing and concentric with the circular hub extensions 20 on the end walls of the housing.

These ends plates carry inwardly projecting pins 21 positioned to engage the ends of the blades and the rotor has annular grooves 22 in opposite ends wide enough to freely receive these pins in the eccentric turning of the rotor in the cylindrical chamber.

The end plates, or at least those parts covering the slotted end portions of the rotor, are continuous and imperforate and these plates, or disks substantially completely fill up the space between the ends of the rotor and the adjoining walls, with free running fit, avoiding waste space.

The outer faces of the sealing disks are flat and smooth to avoid friction losses.

The relative off center movement between rotor and sealing disks is relatively slight and the disks, covering the ends of the rotor and the blades sliding therein prevent any scraping or grooving action of blades and rotor against the end walls of the casing.

This avoidance of grooving wear on the end walls is a desirable factor in maintaining the efficiency of the machine.

If objectionable wear should take place, as by handling of gritty or frictional material, the end plates may be readily replaced.

The end plates may ride the circular bearing hubs on the end walls of the casing or have peripheral bearing engagement with the circular surrounding wall of the casing, or both and these plates can be so light as to add no appreciable load on the machine.

In addition to sealing the blades in their slots in the rotor, the end plates close the annular grooves in the ends of the rotor enabling them to equalize pressures and avoid build up of opposing forces.

The machine consists of but few, simple parts, which can be produced at low cost.

The ends of the blades are continuous, that is, without notches, so as to extend into the annular grooves, in position to be engaged by the pins on the end plates.

The invention differs from and is an improvement over the rotary machine of Patent 3,167,022 of Jan. 26, 1965, in that the blades are sealed in place and do not require notching or other machine operations and hence are less expensive.

The circular grooves in the ends of the rotor are wide enough to receive the pins, free of contact therewith in all rotary positions of the rotor and the blades are free for self-adjusting radial movement in the slots, making them self-compensating for varying pressure conditions.

While adapted for various power or pumping operations, the invention is particularly useful and designed for pumping operations, either as a compressor or a vacuum pump.

The sealing plates may be light and thin and be of a low frictional co-efficient material, such as stainless steel.

What is claimed is:

1. A rotary machine comprising
   a casing having a cylindrical peripheral wall and flat, single plane parallel spaced end walls cooperatively forming a cylindrical chamber,
   a shaft journaled eccentrically in said cylindrical chamber,
   a cylindrical rotor on said shaft in tangential relation with the surrounding cylindrical wall of the chamber,
   said peripheral wall having inlet and outlet passages located at opposite sides of the line of tangency of the rotor,
   said rotor having radially disposed guide slots,
   blades slidingly contained in said slots in cooperative relation with the surroundings peripheral wall of the casing,
   thin, flat single plane circular end plates covering opposite ends of the rotor and blades seated therein,
   said end plates having continuous smooth, flat outer faces in free running relation with the end walls of the casing,
   projections on the inner faces of said end plates radially positioned to engage the ends of the blades in the rotor, and
   said rotor having annular grooves in the ends of the same positioned to freely receive said projections on the inner faces of the end plates.

2. The invention according to claim 1, in which
   said end plates are of low frictional co-efficient material extending the full diameter of the inner circumference of said cylindrical peripheral wall and
   in which said projections are in the form of pins on the inner faces of the end plates, and in which said grooves in the ends of the rotor are of a width to freely receive the pins, without contacting the same in all the rotating positions of the rotor.

References Cited

UNITED STATES PATENTS

| | | | |
|---|---|---|---|
| 2,098,652 | 11/1937 | Buckbee | 103—136 |
| 2,348,428 | 5/1944 | Tucker | 103—121 |
| 2,791,184 | 5/1957 | Sturm | 103—121 |
| 2,925,786 | 2/1960 | Hill | 103—136 |
| 2,938,468 | 5/1960 | Kececioglu et al. | 103—136 |
| 2,969,021 | 1/1961 | Menon | 103—121 |
| 2,975,716 | 3/1961 | Eickmann | 103—136 |
| 3,136,304 | 6/1964 | Tauscher | 103—136 |
| 3,154,293 | 10/1964 | Matson | 103—136 |
| 3,167,022 | 1/1965 | Scognamillo | 103—136 |
| 3,193,190 | 7/1965 | Lindberg | 103—126 |

DONLEY J. STOCKING, *Primary Examiner.*

W. J. GOODLIN, *Assistant Examiner.*